Patented Oct. 24, 1950

2,527,305

UNITED STATES PATENT OFFICE 2,527,305

FAT RENDERING PROCESS

Paul Halmbacher, Waukesha, Wis., assignor to Paul-Lewis Laboratories, Inc., Milwaukee, Wis., a corporation of Wisconsin No Drawing. Application December 10, 1948, Serial No. 64,693

8 Claims. (Cl. 195—3)

This invention relates to a composition and a method for rendering fats, and it is particularly concerned with a composition containing a proteolytic enzyme and a method by which the composition is employed with a fat-containing material to be rendered.

In the rendering of fats from animal tissues, it is necessary to break down the structure of the tissue cells in order to release the fats contained therein. In the usual rendering operation, the release of fat is effected solely by heating the fat-containing material, thereby rupturing the cells and allowing the hot liquid fat to escape. This heating step is continued until a separation of melted fat from the residual animal tissues (cracklings) has substantially been accomplished.

In effecting the separation of fat in the above described manner, it is necessary that heat be applied to the raw fat materials for a relatively long period of time. The fat-containing cells are slow to break down, and while a certain amount of the fat near the wall of any heating vessel is quickly liquefied and released, the heat is but slowly transferred through the remaining solid fat portions. Consequently, the liquid fat formed in the initial states of the melting operation must be kept hot for an unduly long period of time.

As a result of prolonged heating, various undesirable characteristics are imparted to the finished fat product. For example, heat slowly destroys the natural anti-oxidants of the fat, thereby reducing its keeping qualities. Further, an undesirable flavor gradually develops in the fat as the heating period is lengthened. Heat, together with steam, also causes the development of free fatty acids in the fat and thereby undesirably lowers the smoke point of the resulting product. Having the above mentioned difficulties in mind, workers in the art have long sought to provide a method whereby fat may be successfully rendered by a heating period of much shorter duration than past experience has shown to be necessary.

One object of my invention is to provide a proteolytic enzyme composition which reduces the time required and particularly the heating time required in rendering fats from fat-containing materials.

Another object of my invention is to provide a composition including an active enzyme dissolved in an aqueous-polyhydric alcohol solution which has the property of rapidly penetrating the cell walls of the fat-containing tissues to provide a sufficient concentration of the enzyme at its point of action within a time period so short that no digestion or incubation period is required in the rendering process.

Another object of this invention is to provide an improved method of rendering fats wherein a relatively short heating period is employed.

A further object is to provide a rendering process whereby fats of improved quality and with improved keeping quality, may be obtained.

Another primary object of the invention is to provide a fat-rendering process whereby a greater yield of fat may be rendered from a given amount of fat-containing animal tissue than has heretofore been possible, while at the same time providing a method which is more economical than are conventional rendering operations.

The nature of these and other objects will become more apparent from a consideration of the following disclosure of my invention.

I have discovered that fats may be rendered from the natural, fat-containing animal tissues with improved results by first mixing with the said tissue a suitable proteolytic enzyme in an aqueous polyhydric alcohol solution and thereafter heating the mixture. With the aid of the enzyme, the fat-containing materials release their fat content in a much shorter time than would otherwise be the case, thereby materially reducing the heating period necessary to a proper rendering of the fat.

Any one or more of various proteolytic enzymes which are effective at a pH value from about 4 to about 7.5 may be employed in carrying out this invention, a commercially available enzyme concentrate being normally used. For example, enzymes of plant origin such as those commonly known as bromelin, ficin, and papain, as well as those of the Caricaceae type such as *Pileus mexicanus*; enzymes of mold origin such as those derived from *Aspergillus oryzae, Aspergillus niger, Aspergillus alliaceus, Aspergillus wentii*, and *Penicillium glaucum*; and those derived from the overall culture of bacterial organisms such as *Bacterium subtilus, Bacillus mesenterious*, and bacteria of the Clostridium type, may be used. Of the various enzymes which are adapted for use in my invention, I prefer to use those of plant origin which are recited above.

The polyhydric alcohol group discovered to have the properties of rapid penetration of cell tissues and of preserving action in aqueous enzyme solution is, in particular, the 3-carbon chain polyhydric alcohols, namely, glycerol and propylene glycol.

The enzyme selected (normally a commercially available concentrate of the enzyme) is dissolved in an aqueous solution of at least 20 per cent by volume of a 3-carbon chain polyhydric alcohol, and the resulting solution is filtered without delay to remove any insoluble component. Each gallon of the resulting solution so obtained should normally contain the soluble portion derived from about 25 to about 150 grams, and preferably from about 40 to about 60 grams, of the commercial enzyme concentrate. Larger proportions of the enzyme may be used if desired, but such use unduly raises the cost of the solution and is without any particular advantage unless a concentrated solution is to be prepared for later dilution.

The polyhydric alcohols used in the solution are propylene glycol and glycerol, the last named compound being preferred for use in this invention. As stated above, the enzyme solution should contain a total of at least 20 per cent by volume of the polyhydric alcohol, though larger proportions may be employed if desired, particularly when a concentrated solution of the enzyme is to be prepared for later dilution when the solution is used.

Improved results are obtained by introducing into the enzyme solution a quantity of an activator substance. The substances used are those which are reducing in character and which do not destroy the activity of the enzyme. For example, various hydrosulphites and sulphites may be used, as well as such sulphydril compounds as cysteine or methionine, cysteine being preferred. The addition of from about 0.01 gram to about 1.0 gram of the activator substance per gallon of solution is normally sufficient, and a quantity of about 0.04 gram of cysteine, for example, has been introduced with success into each gallon of the enzyme solution.

The enzyme solution described above is a suitable one which may be stored for a long period of time without deteriorating or otherwise becoming unfit for use.

In carrying out the process described herein, the enzyme solution is thoroughly mixed with the fat-containing materials while the latter are still at room temperatures, or below. From about ½ to about 1½ gallons of the enzyme solution, and preferably about one gallon thereof, are used for each 1,000 pounds of raw fat. The preferred procedure is to spray the enzyme solution over the raw, fat-containing animal tissues as the latter are passed through a meat grinder having an outlet plate, the openings in which measure ¾ inch or less in diameter. The enzyme is thus evenly dispersed throughout the fat-containing material and is in position to act on the proteinaceous cell structure which encloses the fat particles where, upon heating of the raw material, the enzyme assists in breaking down the walls of the cells to release the fat. Larger proportions than 1½ gallons of the solution per 1,000 pounds of fat-containing tissue may be used, but the yield of fat is not materially increased thereby over that obtained when using a lesser amount of the solution.

After being ground and mixed with the enzyme solution, the raw fat material is placed in a suitable vessel arranged to be heated by a conventional means, as by steam or, in some cases, an open flame. Any method of heating is satisfactory provided the vessel does not become so hot as to scorch the fatty materials contained therein.

Heat is then continuously applied to the fat-containing vessel (which may be either hot or cold when the raw fat material is placed therein) until the rendering of the fat is complete, the enzymes present being destroyed as the inactivation temperature for the enzyme is reached, and particularly at temperatures above 160° F. It will be apparent to the operator that the fat is released from the raw fat material in the liquid condition much more quickly than is the case when no enzyme solution is used.

Under normal heating conditions, and with conventional fat rendering equipment, it should not be necessary to heat the enzyme-containing fat material for a period more than about 90 to 100 minutes, and heating periods as short as 60 to 75 minutes are common, in contrast with average heating periods of about 120 to 250 minutes for fat-containing mixtures wherein no enzyme solution has been introduced. While there is no arbitrary standard by which the operator may determine the point at which the rendering step is complete, one guiding factor is the appearance of the cracklings which float on the liquid fat. In the process described herein, the cracklings have a spongy appearance when the rendering is complete and are not as solid as they are when no enzyme is added. In any event, the temperature of the mixture should not be allowed to rise above about 240° F. if best results are to be obtained.

Once the rendering operation is complete, the liquid fat is separated from the cracklings with the aid of conventional equipment.

I have found that, in every case when the enzyme solution is employed, the yield of fat obtained from a given amount of raw fat mixture is at least 5 per cent, and often as high as 10 or more per cent, greater than is the case when no enzyme is added. Conversely, the separated cracklings, which are normally sold as an animal feed, contain an appreciably lower percentage of fat, and therefore a desired higher percentage of protein, as indicated in terms of total nitrogen content, than is the case with cracklings produced by conventional, enzyme-free, rendering processes.

Repeated tests demonstrate that the quality of the fats obtained by a practice of my invention is superior to that of fats obtained by conventional methods, the fats produced in accordance with the method herein described having no unpleasant odor, better keeping qualities, and a higher smoke point. Inasmuch as the heating period is reduced, the process of the present invention is more economical than others due to lower fuel costs.

The following examples will serve to illustrate the improved yields and decreased heating periods made possible by my invention.

Example I 2,400 pounds of pork trimmings were ground and mixed with 2½ gallons of a solution, each gallon of which contained 50 grams of commercial papain concentrate, 0.04 gram of cysteine, and 30 per cent by volume (1.2 quarts) of glycerol, the balance of the solution being made up of water. The fat-containing tissue and enzyme mixture was placed in a rendering vat and was heated for 90 minutes, at the end of which time the rendering operation was complete. The cracklings were separated from the fat (lard) and it was found that 2,115 pounds of lard had been obtained, a percentage yield of 88.12 per cent.

2,400 pounds of pork trimmings, selected from the same lot as those from which the trimmings referred to above were taken, were then ground and rendered under the identical conditions of the process described in the preceding paragraph, except that no enzyme solution was added. In this case, a heating period of 205 minutes was found to be necessary to complete the rendering process. The yield of lard was 1,932 pounds, or but 80.5 per cent.

*Example II*

2,000 pounds of pork trimmings were ground and mixed with 2½ gallons of the same enzyme solution as that described in Example I. The resulting fat-containing tissue and enzyme mixture was then heated in a vat until the fat was completely rendered, a total heating period of 88 minutes being necessary. The lard was then separated from the cracklings, and it was found that 1,793 pounds of lard were obtained, a yield of 89.65 per cent.

A second batch of 2,000 pounds of pork trimmings, selected from the same lot as those from which the trimmings in the test described in the preceding paragraph were taken, was then ground and rendered under the identical conditions described above, but without the addition of the enzyme solution. In this case, a heating period of 121 minutes was necessary to a complete rendering of the lard, and the yield was only 1,671 pounds, or 83.55 per cent.

Having thus described my invention and certain embodiments thereof, I claim:

1. An enzyme composition for use in the rendering of fats and consisting of proteolytic enzymes derived from the groups including bromelin, ficin and papain of plant origin; proteolytic enzymes of mold origins and proteolytic enzymes of bacterial origin, a water-3 carbon chain polyhydric alcohol solvent, and an enzyme activator of the group including cysteine, methionine, or bisulfites as reducing substances.

2. A composition for use in rendering fat from fat containing tissues, consisting of 25 to 75 grams per gallon of papain, a solvent of water and glycerol containing 15 to 25% glycerol, and 0.01 to 0.10 gram per gallon of cysteine.

3. The composition of claim 2 in which glycerine is replaced by propylene glycol.

4. The composition of claim 2 in which papain is replaced by ficin.

5. A composition for use in rendering fat containing tissues, consisting of 25 to 75 grams per gallon of ficin, a solvent of water and glycerol containing 15 to 25% propylene glycol, and 0.01 to 0.10 gram per gallon of cysteine.

6. A composition for use in rendering fat from fat containing tissues, consisting of 25 to 75 grams per gallon of papain, a solvent of 10% of water and glycerol, and 0.01 to 0.10 gram per gallon of cysteine.

7. The process of rendering fat from fat containing materials comprising the steps of intimately mixing the fatty material with the composition of claim 1, and heating the mixture up to 240° F. until the fat is rendered.

8. The composition of claim 2 wherein the water content of the solvent is reduced to not more than 10%.

PAUL HALMBACHER.

REFERENCES CITED

The following references are of record in the file of this patent:

UNITED STATES PATENTS

| Number | Name | Date |
|---|---|---|
| 1,922,484 | Mapson | Aug. 15, 1933 |
| 2,164,936 | Miller | July 4, 1939 |
| 2,423,102 | Keil | July 1, 1947 |

OTHER REFERENCES

Chem. Abstr., 1938, p. 3498, by Davis.
Enzyme Technology, by Tauber, 1943 ed., p. 136.